United States Patent
Hosoda

(10) Patent No.: US 8,416,437 B2
(45) Date of Patent: Apr. 9, 2013

(54) IMAGE FORMING APPARATUS, CONTROL METHOD THEREFOR, AND PROGRAM

(75) Inventor: Osamu Hosoda, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 786 days.

(21) Appl. No.: 12/349,468

(22) Filed: Jan. 6, 2009

(65) Prior Publication Data

US 2009/0195816 A1 Aug. 6, 2009

(30) Foreign Application Priority Data

Feb. 4, 2008 (JP) ................................ 2008-024257

(51) Int. Cl.
*G06F 3/12* (2006.01)

(52) U.S. Cl. .......... 358/1.15; 358/1.1; 358/406; 380/51; 399/366

(58) Field of Classification Search ................... 358/1.1, 358/1.13, 1.15, 475, 496, 406; 380/51; 399/366; 271/298, 3.14; 455/436

See application file for complete search history.

(56) References Cited

U.S. PATENT DOCUMENTS

| | | | | |
|---|---|---|---|---|
| 5,435,544 | A * | 7/1995 | Mandel | 271/298 |
| 5,677,777 | A * | 10/1997 | Tsai | 358/475 |
| 5,777,882 | A * | 7/1998 | Salgado | 700/214 |
| 5,926,290 | A * | 7/1999 | Chen et al. | 358/496 |
| 5,940,582 | A * | 8/1999 | Akabori et al. | 358/1.13 |
| 7,359,707 | B2 * | 4/2008 | Merson et al. | 455/436 |
| 7,639,379 | B2 * | 12/2009 | Enomoto et al. | 358/1.14 |
| 7,701,617 | B2 * | 4/2010 | Johnson et al. | 358/406 |
| 7,719,708 | B2 * | 5/2010 | Ferlitsch et al. | 358/1.15 |
| 7,800,767 | B2 * | 9/2010 | Matsushima et al. | 358/1.1 |
| 2005/0078993 | A1 * | 4/2005 | Oomura et al. | 399/366 |
| 2006/0061807 | A1 | 3/2006 | Matsuda | |
| 2007/0133792 | A1 * | 6/2007 | Utsumi et al. | 380/51 |
| 2007/0273914 | A1 | 11/2007 | Hosoda | |
| 2009/0261524 | A1 * | 10/2009 | Nakayama et al. | 271/3.14 |
| 2010/0245900 | A1 * | 9/2010 | Morimoto | 358/1.15 |

FOREIGN PATENT DOCUMENTS

| | | |
|---|---|---|
| JP | 10-329398 | 12/1998 |
| JP | 2006-92000 A | 4/2006 |
| JP | 2007-38511 A | 2/2007 |
| JP | 2007-304734 A | 11/2007 |

OTHER PUBLICATIONS

Japanese Office Action dated May 25, 2012 issued in corresponding Japanese Patent Application No. 2008-024257.

Japanese Office Action dated Aug. 10, 2012 issued in Japanese Patent Application No. 2008-024257.

* cited by examiner

*Primary Examiner* — David K Moore
*Assistant Examiner* — Ashish K Thomas
(74) *Attorney, Agent, or Firm* — Fitzpatrick, Cella, Harper & Scinto

(57) ABSTRACT

It is analyzed whether print data includes first image data common between pages and second image data different between pages. When a specific discharge device is designated as a discharge device for discharging a printing medium printed based on the print data, and it is analyzed that the print data includes the second image data different between pages, print processing is controlled not to print the second image data.

7 Claims, 14 Drawing Sheets

VIEW (V)  TRACE (T)  HELP (H)

PRINT STATUS | JOB LOG | CHECK CONSUMABLES | OTHER STATUSES

■ TOTAL WAITING TIME: ABOUT 2 MIN

| ACCEPTANCE NUMBER | TIME | JOB NAME | USER NAME | STATUS | WAITING TIME (MIN) |
|---|---|---|---|---|---|
| 0003 | 19:47 | COPY | | DURING PRINTING | 2 MIN |

6002    6003

PRIORITY PRINT | DETAILED INFORMATION ▲ | STOP | CHECK PRINT ▲ | VDP CHECK PRINT

◀ 1/1 ▶

DEVICE INFORMATION

6001

DISPLAY OF RESTORE PROCEDURES

0003 COPY    0014/0100 ABOUT 002 MIN

PORT : 60103 | CONNECTED | READY

CLOSE

FIG. 10

| 10002 | 10003 |
|---|---|
| 001 | /data/photo/Tokyo/b1.pdf |
| 002 | /data/photo/Tokyo/b3.pdf |
| 003 | /data/photo/Nagoya/b1.pdf |
| 004 | /data/photo/Kyoto/b1.pdf |
| 005 | /data/photo/Tokyo/b18.pdf |
| 006 | /data/photo/Tokyo/b31.pdf |
| ... | ...... |
| ... | ...... |
| ... | ...... |

10001

IMAGE FORMING APPARATUS, CONTROL METHOD THEREFOR, AND PROGRAM

BACKGROUND OF THE INVENTION

1. Field of the Invention

The present invention relates to an image forming apparatus which discharges, to a designated discharge device among a plurality of discharge devices, a printing medium printed based on print data, a control method therefor, and a program.

2. Description of the Related Art

When printing an image including personal information, like a form or direct mail, conventional image forming apparatuses print while individually processing variable data formed from information common between records, and information different between records, like the address and name.

Variable data is data (data formed from information which changes between records) generated based on information managed in a database. Variable data is sometimes created as part of print data by an image editing apparatus, and transmitted to an image forming apparatus.

Image data common between records is generally stored as form image data in the internal storage device of an image forming apparatus while a corresponding job is processed. The common image data is composited with image data formed from information different between pages or records, and then printed.

Conventional image forming apparatuses generally include a plurality of discharge devices for externally discharging a printed material bearing an image. The function of the discharge device changes depending on the application purpose of the discharge device.

For example, a discharge device having a function of storing a large volume of printed materials has a cover to inhibit taking out or touching printed materials from the outside during printing in order to stably hold many printed materials.

There is a specific discharge device for discharging a printed material of a specific page or specific record during printing in order to check the printed state. The specific discharge device allows the operator of an image forming apparatus to easily view a printed material or take it out even during printing.

In a conventional printing system, when discharging a printed material of a specific page or specific record to a specific discharge device during printing in order to check the printed state, a printed material bearing the same image as that of a final product is discharged to the discharge device.

As disclosed in Japanese Patent Laid-Open No. 10-329398, a technique of replacing variable data in print data with specific data before outputting a form has conventionally been applied to confirm the printed image of the form.

However, according to the conventional technique, one other than an operator who performs print processing may view or take out a printed material for checking the printed state during printing.

Particularly when a printed material bearing an image including confidential information or personal information, like a form or direct mail, falls into the hands of a person not permitted to view the printed material, the confidential information or personal information may leak from the printing system. The conventional technique suffers such a security hole in the printing system.

If printing continues without checking the printed state, in order to prevent the leakage of confidential information and personal information, the operator cannot grasp degradation of the print quality upon a change of the state of the printing apparatus over time. This may result in a poor-quality final product.

SUMMARY OF THE INVENTION

The present invention has been made to overcome the conventional drawbacks, and has as its object to provide an image forming apparatus capable of reducing the chance to view a printed material by a person permitted to perform a print operation when the printed material is discharged to a specific discharge device, and reducing the chance to leak confidential information and personal information from a printing system, a control method therefor, and a program.

According to the first aspect of the present invention, an image forming apparatus which discharges, to a designated discharge device among a plurality of discharge devices, a printing medium printed based on print data, the apparatus comprises:

a receiver unit adapted to receive print data;

an analysis unit adapted to analyze whether the print data includes first image data common between pages and second image data different between pages; and a control unit adapted to, when a specific discharge device is designated as the discharge device for discharging a printing medium printed based on the print data, and the analysis unit analyzes that the print data includes the second image data different between pages, control print processing not to print the second image data.

In a preferred embodiment, the control unit controls to discharge, to the specific discharge device, a printing medium bearing an image based on image data included in the print data other than the second image data.

In a preferred embodiment, the analysis unit comprises a first determination unit adapted to determine whether the second image data is image data formed from text data, and when the first determination unit determines that the second image data is image data formed from text data, the control unit controls to discharge, to the specific discharge device, a printing medium bearing an image based on image data included in the print data other than the second image data.

In a preferred embodiment, the apparatus further comprises a storage unit adapted to store a management table which manages a log of image data used to print an image based on the second image data, wherein the analysis unit comprises a second determination unit adapted to determine whether the second image data is image data already registered in the management table, and when the second determination unit determines that the second image data is image data already registered in the management table, the control unit controls to discharge, to the specific discharge device, a printing medium bearing an image based on image data included in the print data other than the second image data.

In a preferred embodiment, the control unit controls to discharge, to the specific discharge device, a printing medium bearing an image based on specific image data serving as an alternative of the second image data included in the print data, and image data included in the print data other than the second image data.

In a preferred embodiment, the apparatus further comprises an image data storage unit adapted to store specific image data, wherein the control unit controls to discharge, to the specific discharge device, a printing medium bearing an image based on the specific image data stored in the image data storage unit, instead of the print data including the second image data.

According to the second aspect of the present invention, an image forming apparatus which discharges, to a designated discharge device among a plurality of discharge devices, a printing medium printed based on print data, the apparatus comprises:

an image data storage unit adapted to store specific image data;

a receiver unit adapted to receive print data;

an analysis unit adapted to analyze whether the print data includes first image data common between pages and second image data different between pages; and a control unit adapted to, when a specific discharge device is designated as the discharge device for discharging a printing medium printed based on the print data, and the analysis unit analyzes that the print data includes the second image data different between pages, print on a printing medium on the basis of the first image data and second image data included in the print data, and the specific image data stored in the image data storage unit.

In a preferred embodiment, the specific image data includes one of a watermark image and a copy-forgery-inhibited pattern image.

According to the third aspect of the present invention, a method of controlling an image forming apparatus which discharges, to a designated discharge device among a plurality of discharge devices, a printing medium printed based on print data, the method comprises:

a reception step of receiving print data;

an analysis step of analyzing whether the print data includes first image data common between pages and second image data different between pages; and a control step of, when a specific discharge device is designated as the discharge device for discharging a printing medium printed based on the print data, and the print data is analyzed in the analysis step to include the second image data different between pages, controlling print processing not to print the second image data on a printing medium.

According to the fourth aspect of the present invention, a program stored in a storage medium to cause a computer to control an image forming apparatus which discharges, to a designated discharge device among a plurality of discharge devices, a printing medium printed based on print data, the program causing the computer to execute a reception step of receiving print data, an analysis step of analyzing whether the print data includes first image data common between pages and second image data different between pages, and a control step of, when a specific discharge device is designated as the discharge device for discharging a printing medium printed based on the print data, and the print data is analyzed in the analysis step to include the second image data different between pages, controlling print processing not to print the second image data on a printing medium.

According to the fifth aspect of the present invention, a method of controlling an image forming apparatus which discharges, to a designated discharge device among a plurality of discharge devices, a printing medium printed based on print data, the method comprises:

a reception step of receiving print data;

an analysis step of analyzing whether the print data includes first image data common between pages and second image data different between pages; and a control step of, when a specific discharge device is designated as the discharge device for discharging a printing medium printed based on the print data, and the print data is analyzed in the analysis step to include the second image data different between pages, printing on a printing medium on the basis of the first image data and second image data included in the print data, and specific image data stored in an image data storage unit.

According to the sixth aspect of the present invention, a program stored in a storage medium to cause a computer to control an image forming apparatus which discharges, to a designated discharge device among a plurality of discharge devices, a printing medium printed based on print data, the program causing the computer to execute a reception step of receiving print data, an analysis step of analyzing whether the print data includes first image data common between pages and second image data different between pages, and a control step of, when a specific discharge device is designated as the discharge device for discharging a printing medium printed based on the print data, and the print data is analyzed in the analysis step to include the second image data different between pages, printing on a printing medium on the basis of the first image data and second image data included in the print data, and specific image data stored in an image data storage unit.

Further features of the present invention will be apparent from the following description of exemplary embodiments with reference to the attached drawings.

BRIEF DESCRIPTION OF THE DRAWINGS

FIG. 6 is a view showing an example of an operation window displayed on the operation unit of the image forming apparatus according to the first embodiment of the present invention;

FIG. 10 is a table showing an example of an image data management table according to the first embodiment of the present invention;

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

The present invention is directed to a printing system which prints print data created based on information which changes between pages or records, like a form or direct mail.

The present invention is applicable especially to a system which, when outputting many pages based on print data, prints while periodically confirming the printed contents or the state of a printing apparatus.

The present invention can be applied effectively to a printing system in an environment where a person other than one permitted to operate a printing apparatus can see a printed material output from the printing apparatus.

First Embodiment

Figure 1:
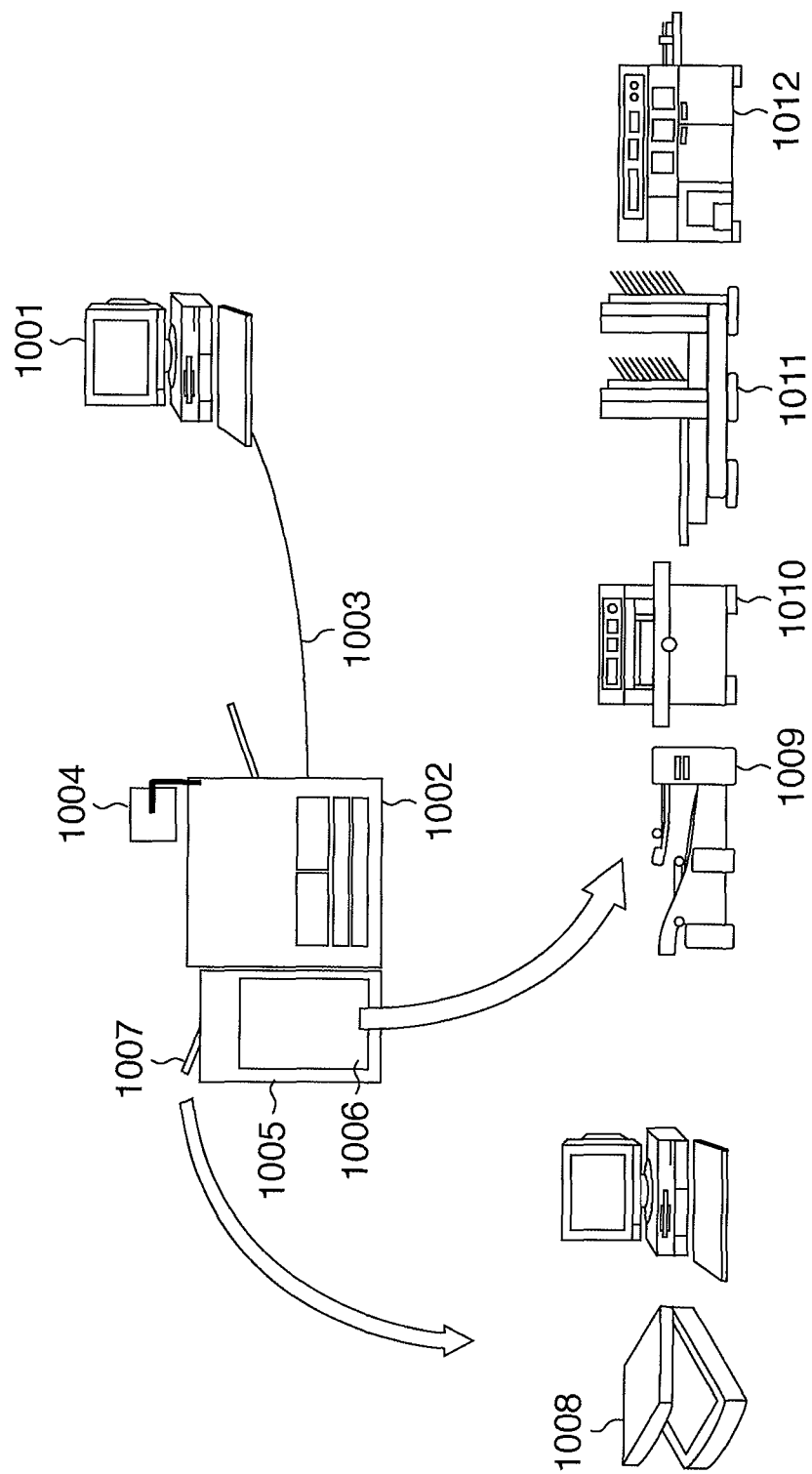
FIG. 1 is a view showing the overall configuration of a printing system according to the first embodiment of the present invention.

FIG. 1 is a view showing the overall configuration of a printing system according to the first embodiment of the present invention.

An image editing apparatus 1001 performs image editing and the like, and a variety of programs run for image editing. The image editing apparatus 1001 converts edited image data into print data, and transmits the print data to an image forming apparatus 1002.

The image forming apparatus 1002 prints print data received from the image editing apparatus 1001. The image forming apparatus 1002 performs print processing by analyzing print data to generate bitmap image data, and transferring (forming) an image based on the bitmap image data onto a printing medium such as paper.

Reference numeral 1003 denotes a network cable. An operation unit 1004 is used to input various instructions to the image forming apparatus 1002. A stacker (discharge device) 1005 discharges a medium printed by the image forming apparatus 1002.

The stacker 1005 includes a stacking portion 1006 for temporarily stacking a large volume of printing media, and a sample tray 1007 which allows the operator of the stacker 1005 to easily take out a printing medium in order to check the printed state. The stacking portion 1006 has a cover to prevent a third party from easily viewing a printed material.

A reading apparatus 1008 is used to check the print density of a printing medium taken out from the sample tray 1007. The image forming apparatus 1002 performs calibration on the basis of information read by the reading apparatus 1008.

Post-processing devices 1009 to 1012 perform post-processing for a printing medium discharged to the stacking portion 1006. The post-processing devices include the paper folding device 1009, sheet cutting device 1010, saddle stitching device 1011, and case binding device 1012.

The functional arrangements of the image editing apparatus 1001 and image forming apparatus 1002 will be explained with reference to FIG. 2.

Figure 2:
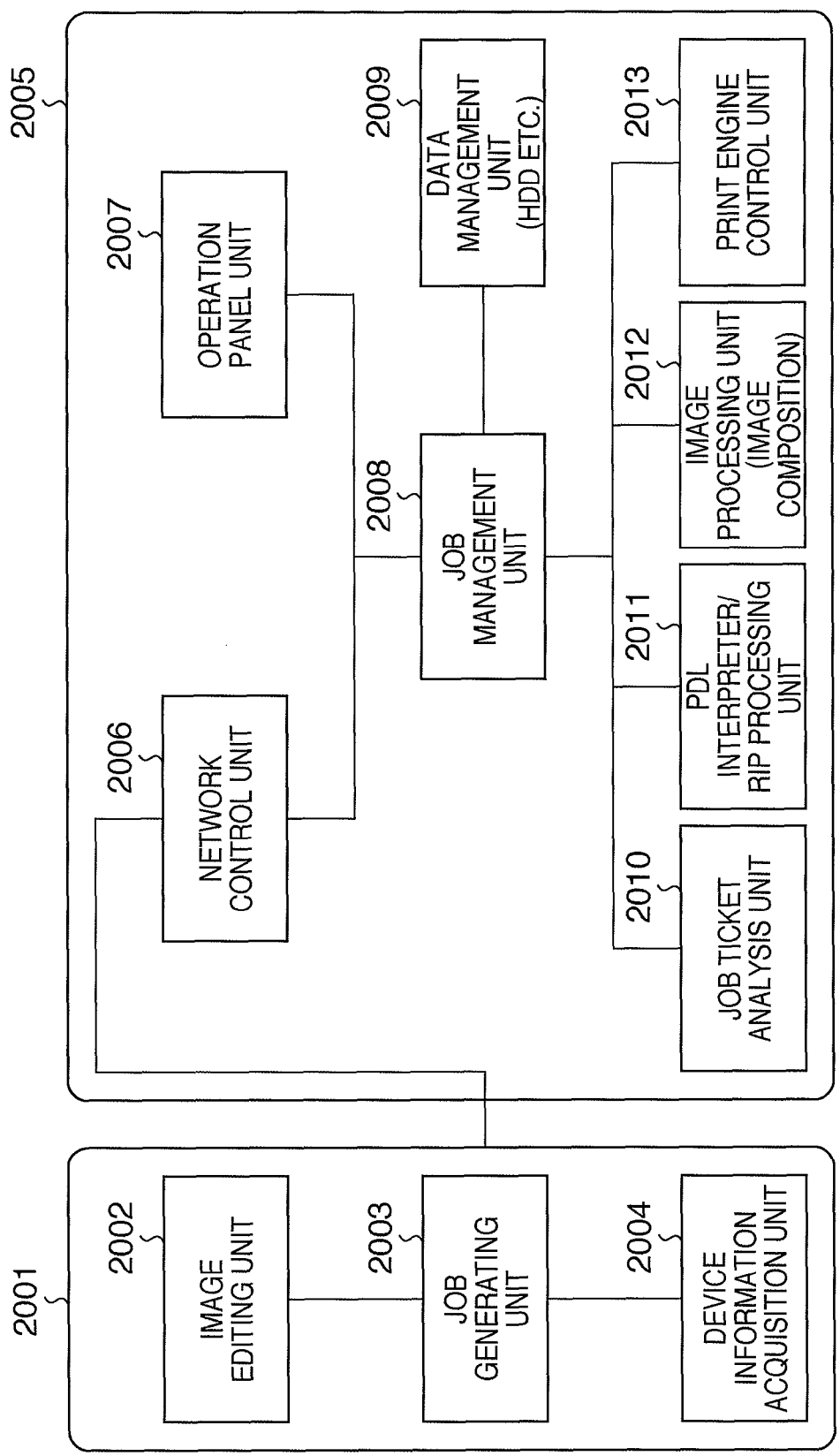
FIG. 2 is a functional block diagram showing the functional arrangements of an image editing apparatus and image forming apparatus according to the first embodiment of the present invention.

FIG. 2 is a functional block diagram showing the functional arrangements of the image editing apparatus and image forming apparatus according to the first embodiment of the present invention.

A functional block 2001 represents the image editing apparatus 1001. An image editing unit 2002 runs on the image editing apparatus 1001 to perform image editing and DTP processing. A job generating unit 2003 converts image data generated by the image editing unit 2002 into print data. A device information acquisition unit 2004 acquires the state of an image forming apparatus 2005 and that of a job processed by the image forming apparatus 2005.

The image forming apparatus or functional block 2005 represents the image forming apparatus 1002. A network control unit 2006 receives print data from an external device. An operation panel unit 2007 is used to input a variety of instructions to the image forming apparatus 1002. As one of operation windows, the operation panel unit 2007 can display, e.g., one shown in FIG. 6 (to be described later).

A job management unit 2008 controls all processes of a job input to the image forming apparatus 1002. A data management unit 2009 includes a storage device for temporarily holding data associated with a job input to the image forming apparatus 1002. The data management unit 2009 stores print data received from the network control unit 2006, and test print image data for confirming the printed state in advance. The data management unit 2009 also functions as an image data storage unit which stores even image data for printing an additional image such as a watermark image or copy-forgery-inhibited pattern image on a print page.

A job ticket analysis unit 2010 analyzes job control instruction data (job ticket) included in print data. A PDL interpreter/RIP processing unit 2011 analyzes image data included in print data to generate bitmap image data.

An image processing unit 2012 performs various image processes such as image composition for image data processed in the image forming apparatus 1002. A print engine control unit 2013 controls image transfer processing and printing medium conveyance processing in the image forming apparatus 1002 to print image data generated based on print data.

The arrangement of the main controller of the image editing apparatus 1001 will be explained with reference to FIG. 3.

Figure 3:
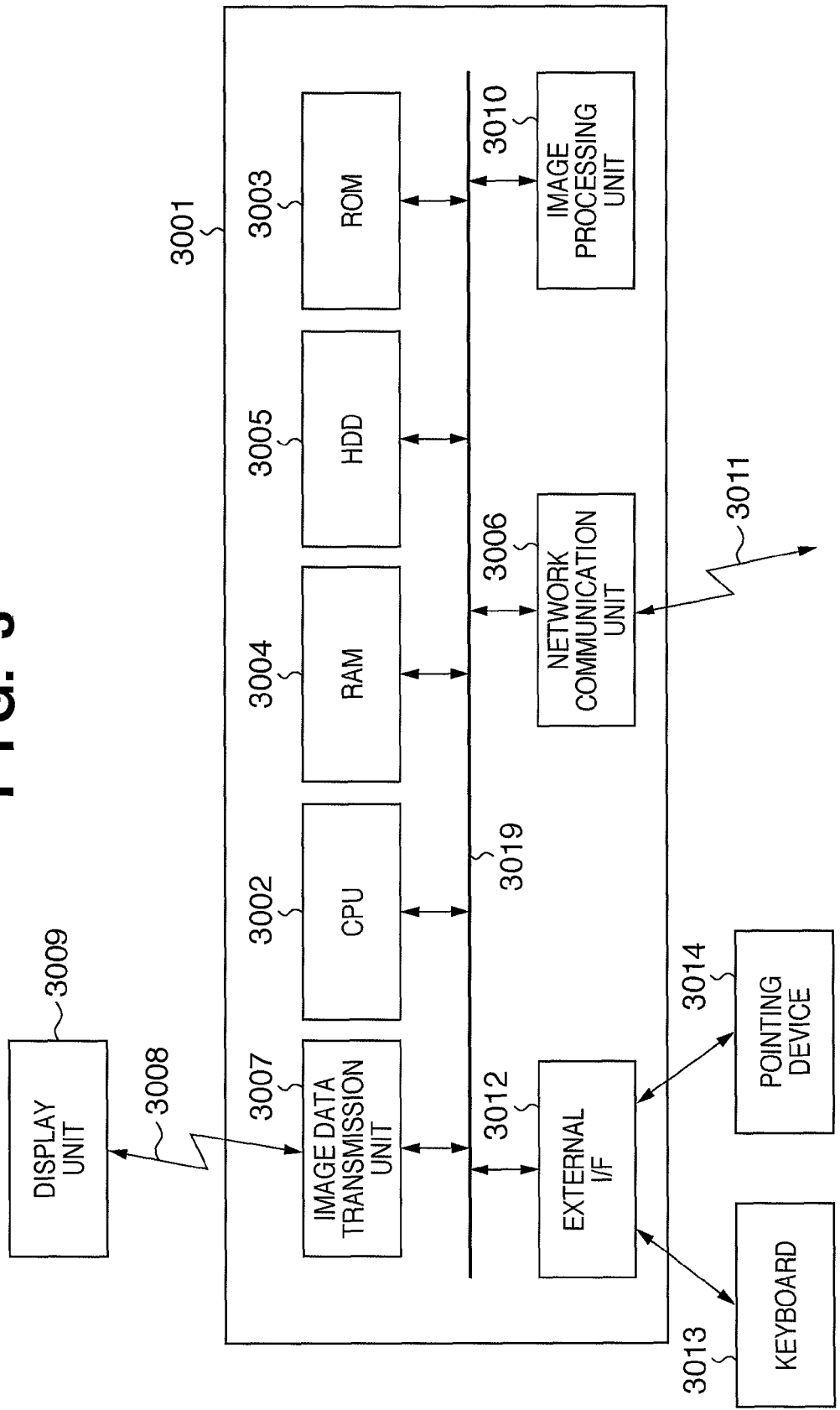
FIG. 3 is a block diagram showing the arrangement of the main controller of the image editing apparatus according to the first embodiment of the present invention.

FIG. 3 is a block diagram showing the arrangement of the main controller of the image editing apparatus according to the first embodiment of the present invention.

A block 3001 represents the overall arrangement of the controller hardware of the image editing apparatus 1001. A CPU 3002 operates a program for controlling the overall image editing apparatus 1001. A ROM 3003 stores a program for activating the image editing apparatus 1001. A RAM 3004 functions as a work area for operating a program for controlling the image editing apparatus 1001.

A hard disk drive (HDD) 3005 serves as a secondary storage device for storing program data to be expanded in the RAM 3004 and operate, the program of application software, and data necessary for application software. A network communication unit 3006 receives/outputs data from/to the image forming apparatus 1002.

An image data transmission unit 3007 transmits image data to an image display apparatus for displaying image data and the like formed in the image editing apparatus 1001. A cable 3008 transmits image data from the image data transmission unit 3007 to an external image display apparatus. A display unit 3009 displays image data received from the image data transmission unit 3007, and various operation windows.

An image processing unit 3010 performs various image processes for bitmap image data received from the network communication unit 3006. The image processing unit 3010 has a function of compositing bitmap image data, and a function of digitally correcting bitmap image data such as a function of, when it is determined that bitmap image data skews, correcting the print position.

A network cable 3011 receives image data from an external device, and transmits print data to an external device. The network cable 3011 is connected to the network communication unit 3006. An external I/F 3012 interfaces an external input/output device. A keyboard 3013 and pointing device 3014 are connected to the external I/F 3012. A bus 3019 connects various building components of the image editing apparatus to each other.

The arrangement of the main controller of the image forming apparatus 1002 will be explained with reference to FIG. 4.

Figure 4:
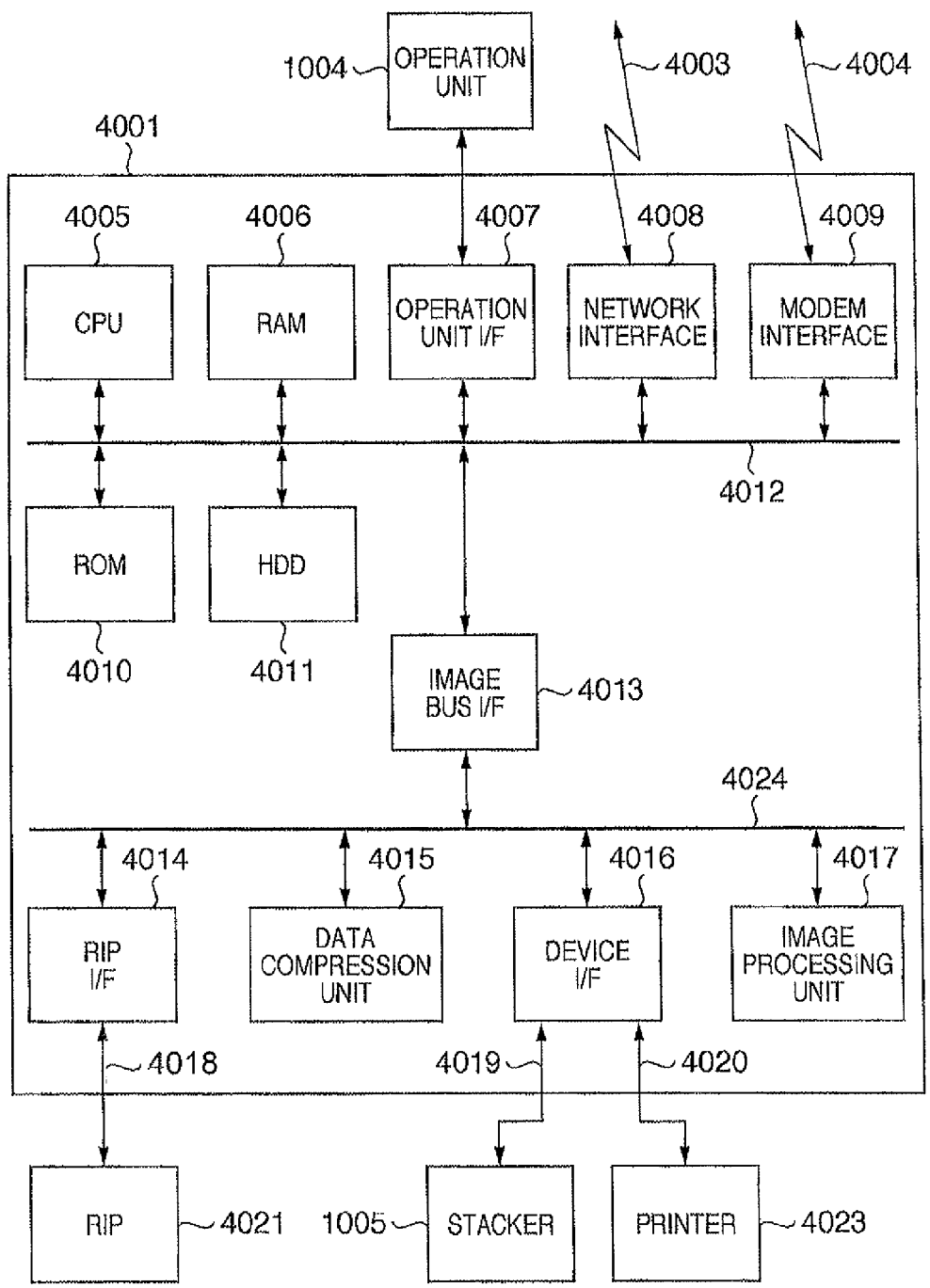
FIG. 4 is a block diagram showing the arrangement of the main controller of the image forming apparatus according to the first embodiment of the present invention.

FIG. 4 is a block diagram showing the arrangement of the main controller of the image forming apparatus according to the first embodiment of the present invention.

A block 4001 represents the overall arrangement of the main controller of the image forming apparatus 1002. The operation unit 1004 is used to operate the apparatus. A network cable 4003 connects the image forming apparatus 1002 to an external device via a network. A line cable 4004 connects the image forming apparatus 1002 to an external device via a telephone line. A CPU 4005 operates a program for controlling the main controller 4001.

A RAM 4006 is managed by a program running on the CPU 4005. The RAM 4006 is used as, for example, a reception buffer for temporarily buffering externally received data, and an image data buffer for temporarily buffering image data rasterized by a RIP.

An interface 4007 connects the operation unit 1004 to the controller 4001. A network interface 4008 connects the controller 4001 to a network. A modem interface 4009 connects the controller 4001 to a telephone line.

A ROM 4010 stores programs running on the CPU 4005, data, and the like. A hard disk drive (HDD) 4011 serves as a nonvolatile storage device capable of saving various data for a long time. Reference numeral 4012 denotes a CPU bus.

An image bus 4024 is connected to hardware modules for performing image processing. An image bus interface (I/F) 4013 connects the CPU bus 4012 to the image bus 4024. A rasterization board (RIP) 4021 has a function of converting externally input image description data into bitmap image data.

A RIP interface (I/F) 4014 connects the RIP 4021 to the image bus 4024 via an image transfer bus 4018. A data compression unit 4015 compresses data. A printer 4023 serves as a printing unit. The printer 4023 can be of an arbitrary printing type such as the laser beam type, inkjet type, or thermal transfer type. A device interface (I/F) 4016 connects the stacker 1005 and printer 4023 to the image bus 4024 via data buses 4019 and 4020, respectively.

An image processing unit 4017 performs various image processes for bitmap image data generated by the RIP 4021. The image processing unit 4017 has functions of digitally processing bitmap image data, such as a function of compositing bitmap image data of two pages into that of one page.

The structure of the stacker 1005 will be explained with reference to FIG. 5.

Figure 5:
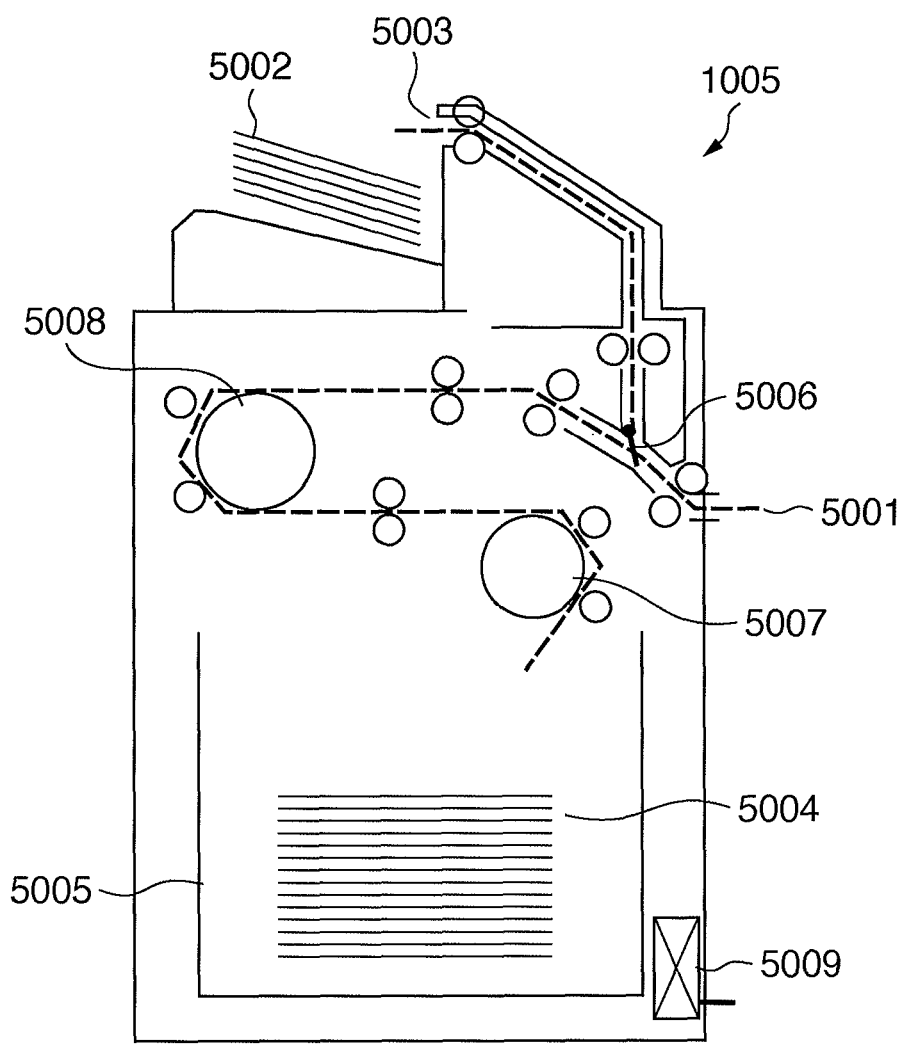
FIG. 5 is a sectional view showing the structure of a stacker according to the first embodiment of the present invention.

FIG. 5 is a sectional view showing the structure of the stacker according to the first embodiment of the present invention.

A printing medium discharged from the image forming apparatus 1002 is loaded to a printing medium loading portion 5001. A sample tray 5002 supports a printing medium discharged for check. A printing medium is discharged from a sample tray discharge port 5003 onto the sample tray 5002.

A stacking portion 5004 temporarily stacks a large volume of printing media. The stacking portion 5004 is configured to inhibit tacking out printing media from the stacker 1005 while printing media are kept discharged onto the stacking portion 5004. The printing medium unloading portion (not shown) of the stacking portion 5004 has a cover which prevents seeing a printing medium from the outside.

A dolly 5005 serves as a container when taking out printing media stacked at the stacking portion 5004. By pulling out the dolly 5005 from the stacker 1005, the operator of the stacker 1005 can tack out printing media while keeping printing media stacked at the stacking portion 5004 tidy.

A conveyance guide 5006 guides, to the sample tray discharge port 5003 or stacking portion 5004, a printing medium loaded via the printing medium loading portion 5001. The operation of the conveyance guide 5006 is controlled in accordance with an instruction from the CPU 4005 of the image forming apparatus 1002. Conveyance rollers 5007 and 5008 assist conveyance of a printing medium.

A controller 5009 controls the conveyance rollers 5007 and 5008 and conveyance guide 5006 of the stacker 1005. The controller 5009 is connected to the image forming apparatus 1002 via a data bus 4019 of the controller 4001 of the image forming apparatus 1002. The controller 5009 can control the stacker 1005 in accordance with an instruction issued from the CPU 4005.

An example of an operation window displayed on the operation unit 1004 of the image forming apparatus 1002 will be explained with reference to FIG. 6.

FIG. 6 is a view showing an example of an operation window displayed on the operation unit of the image forming apparatus according to the first embodiment of the present invention.

In an operation window 6000, a job list 6001 displays jobs processed in the image forming apparatus 1002 to select a job. A button 6002 is used to designate whether to discharge a printed material to the sample tray 1007 of the stacker 1005 in order to check the printing state of a job selected in the job list 6001. That is, the button 6002 is used to designate the sample tray 1007 as a printed material discharge device.

A button 6003 is used to designate whether to discharge a printed material to the sample tray 1007 of the stacker 1005 in order to check the printing state of a job selected in the job list 6001. When the operator presses the button 6003, a printed material is discharged onto the sample tray 1007 under control shown in the flowchart of FIG. 12.

An example of an operation window generated by the job generating unit 2003 of the image editing apparatus 1001 will be explained with reference to FIG. 7.

Figure 7:
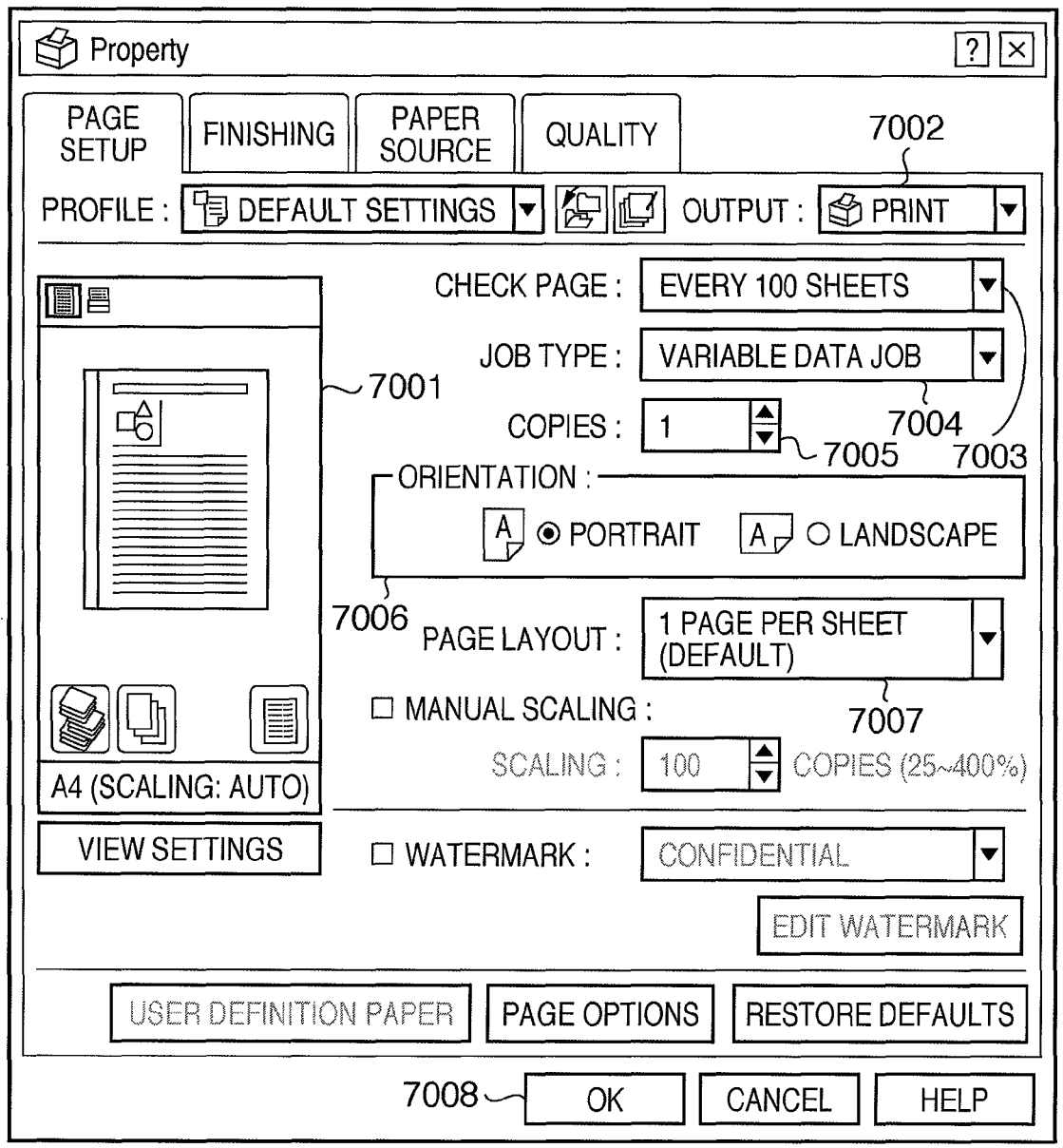
FIG. 7 is a view showing an operation window generated by the job generating unit of the image editing apparatus according to the first embodiment of the present invention.

FIG. 7 is a view showing an operation window generated by the job generating unit of the image editing apparatus according to the first embodiment of the present invention.

In an operation window 7000, a display portion 7001 displays a print style assumed to be processed in the image forming apparatus 1002. A printing method instruction portion 7002 is used to designate a printing method. As the printing method, box printing for holding print data in the storage unit of the image forming apparatus, secure printing for suspending print processing of print data until the password is input, and the like can be designated in addition to printing.

A sample tray discharge interval instruction portion 7003 is used to designate the interval of discharge to the sample tray 1007. A variable job instruction portion 7004 is used to designate whether to apply the control shown in the flowchart of FIG. 12 when discharging a printing medium to the sample tray 1007.

An instruction portion 7005 is used to designate the number of copies. An instruction portion 7006 is used to designate the orientation of printing. The layout means the number of pages arranged on the surface of a printing medium. An instruction portion 7007 is used to designate the layout in printing. An instruction button 7008 is used to finalize print settings.

An example of print data generated by the job generating unit 2003 of the image editing apparatus 1001 will be explained with reference to FIG. 8.

Figure 8:
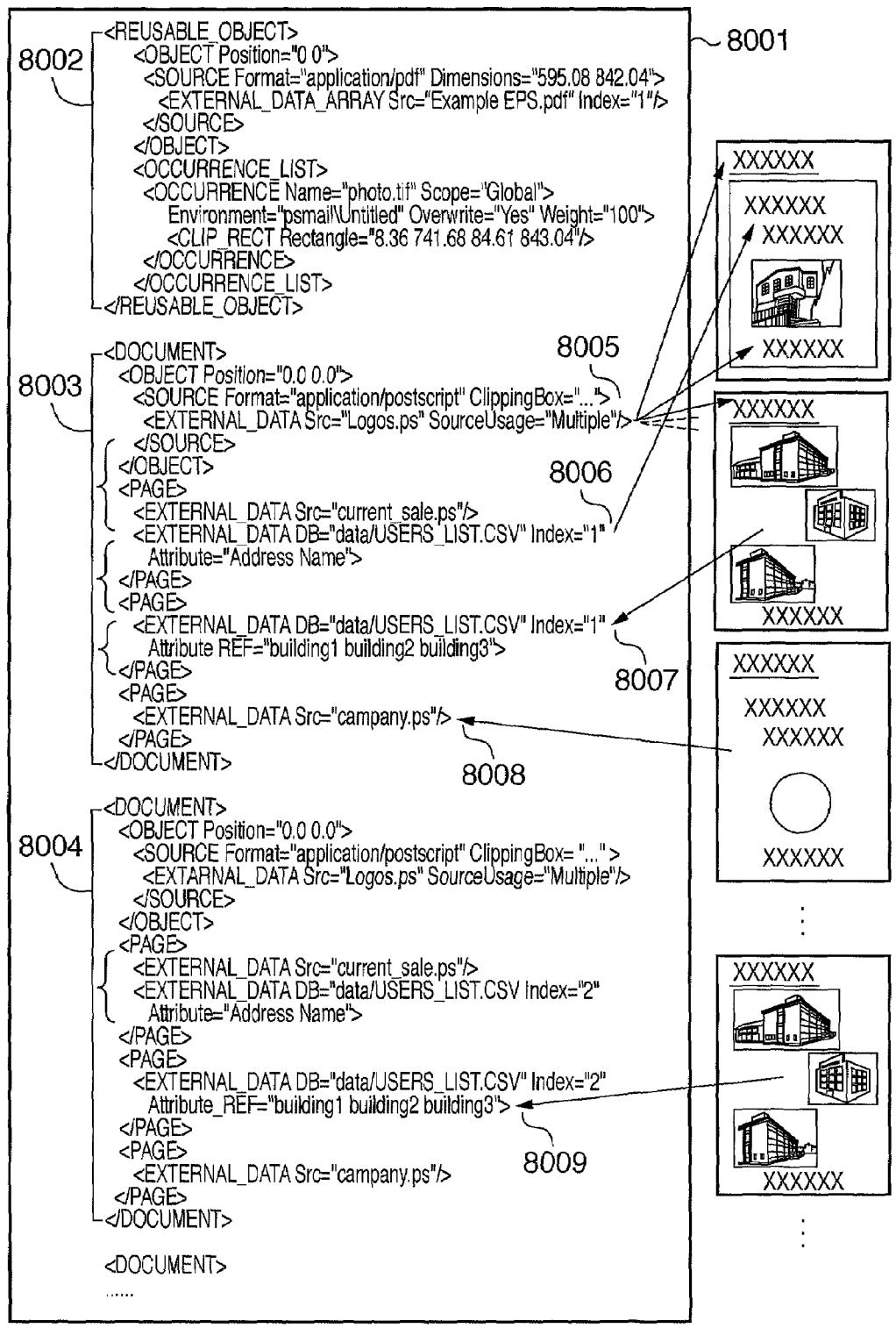
FIG. 8 is a view showing an example of print data generated by the job generating unit of the image editing apparatus according to the first embodiment of the present invention.

FIG. 8 is a view showing an example of print data generated by the job generating unit of the image editing apparatus according to the first embodiment of the present invention.

Print data 8001 is part of print data for defining a job in the first embodiment. A pre-processing instruction part 8002 designates pre-processing for the job. A part 8003 defines the print attributes and image data of the first record of the job. A part 8004 defines the print attributes and image data of the second record of the job. For each record, print attributes and image data corresponding to at least one page are defined.

An instruction 8005 defines image data commonly arranged in a plurality of pages output based on the first record. An instruction 8006 designates variable data which is included in the first record and formed from text data.

An instruction 8007 designates variable data which is included in the first record and formed from image data. The instruction 8007 designates reference to record 2 "building1 building2 building3" in a database "USERS_LIST.CSV" of FIG. 9. Data ".pdf" is detected in FIG. 9 upon referring to the designated portion, so it is determined from the extension that the data is image data.

An instruction 8008 designates permanent data included in the first record. In the first embodiment, permanent data designated by the instruction 8008 is printed in a plurality of records. An instruction 8009 designates variable data included in the second record, and the variable data is image data printed in even the first record. The instruction 8009 designates reference to record 2 "building1 building2 building3" in the database "USERS_LIST.CSV" of FIG. 9. The instruction 8009 describes the use of the same image as that of the first record which refers to the above-mentioned portion in FIG. 9.

Variable data defined in the print data 8001 is provided as data complying with the format of data output from a system which manages data such as a database at once.

An example of a database file which provides variable data defined in the print data 8001 will be explained with reference to FIG. 9.

Figure 9:
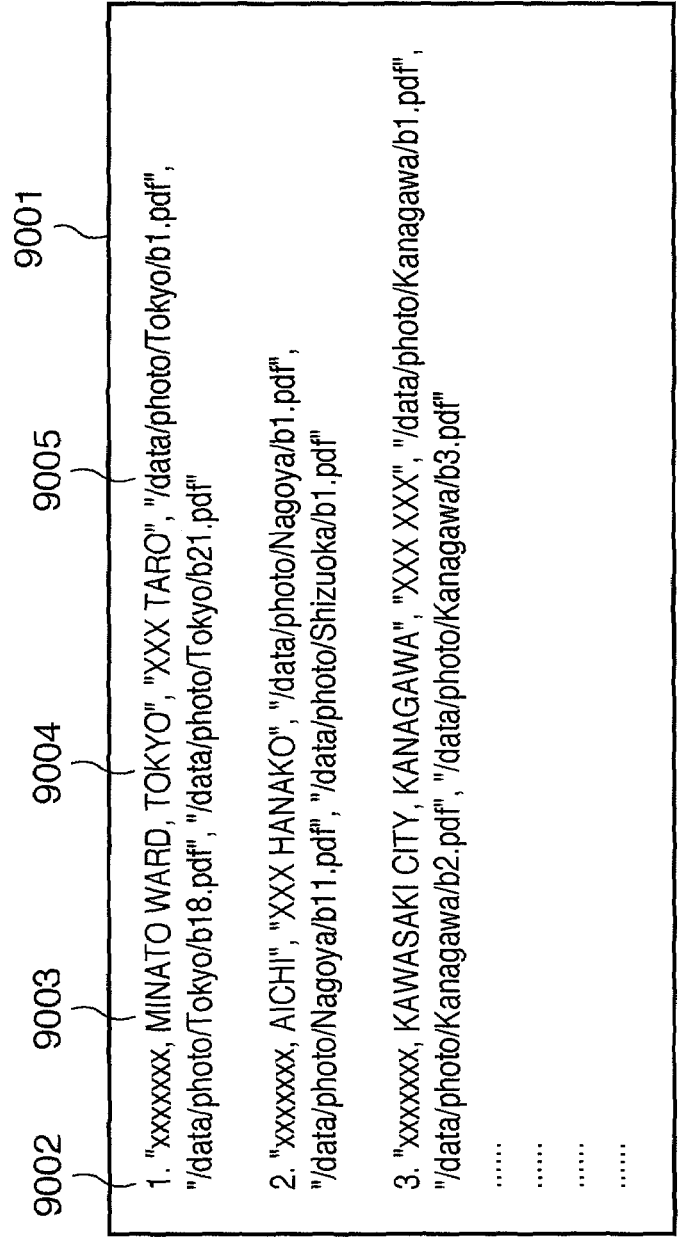
FIG. 9 is a view showing an example of a database file which provides variable data defined in print data according to the first embodiment of the present invention.

FIG. 9 is a view showing an example of a database file which provides variable data defined in print data according to the first embodiment of the present invention.

A database file 9001 represents the entire variable data. The database file 9001 which provides variable data is formed from different information for each record. The data format complies with the format of a database for handling data, or a data format defined in print data.

Index information 9002 is used to identify a record. Information 9003 represents the address of record 1. Information 9004 represents the name of record 1.

A URL 9005 is that of image data applied to record 1. After the job ticket analysis unit 2010 of the image forming apparatus 1002 acquires image data at the URL 9005, the PDL interpreter/RIP processing unit 2011 performs image generation processing on the basis of the image data.

An example of an image data management table functioning as an image data log holding table which holds a log of image data processed by the PDL interpreter/RIP processing unit 2011 when performing print processing on the basis of the print data 8001 will be explained with reference to FIG. 10.

FIG. 10 is a table showing an example of an image data management table according to the first embodiment of the present invention.

An image data management table 10001 functions as an image data log holding table for holding the log of image data. An index number 10002 is that of image data. Path information 10003 is formed from a URL representing a location where acquired image data is held. The image data management table 10001 is managed by, e.g., the data management unit 2009. The image data management table 10001 manages a list of the URLs of image data serving as content data printed in a page of print data.

By comparing (collating) the path information 10003, the image forming apparatus 1002 can determine whether the target image data was printed before.

An example of print data obtained by adding sample data of variable data to the print data 8001 will be explained with reference to FIG. 11.

Figure 11:
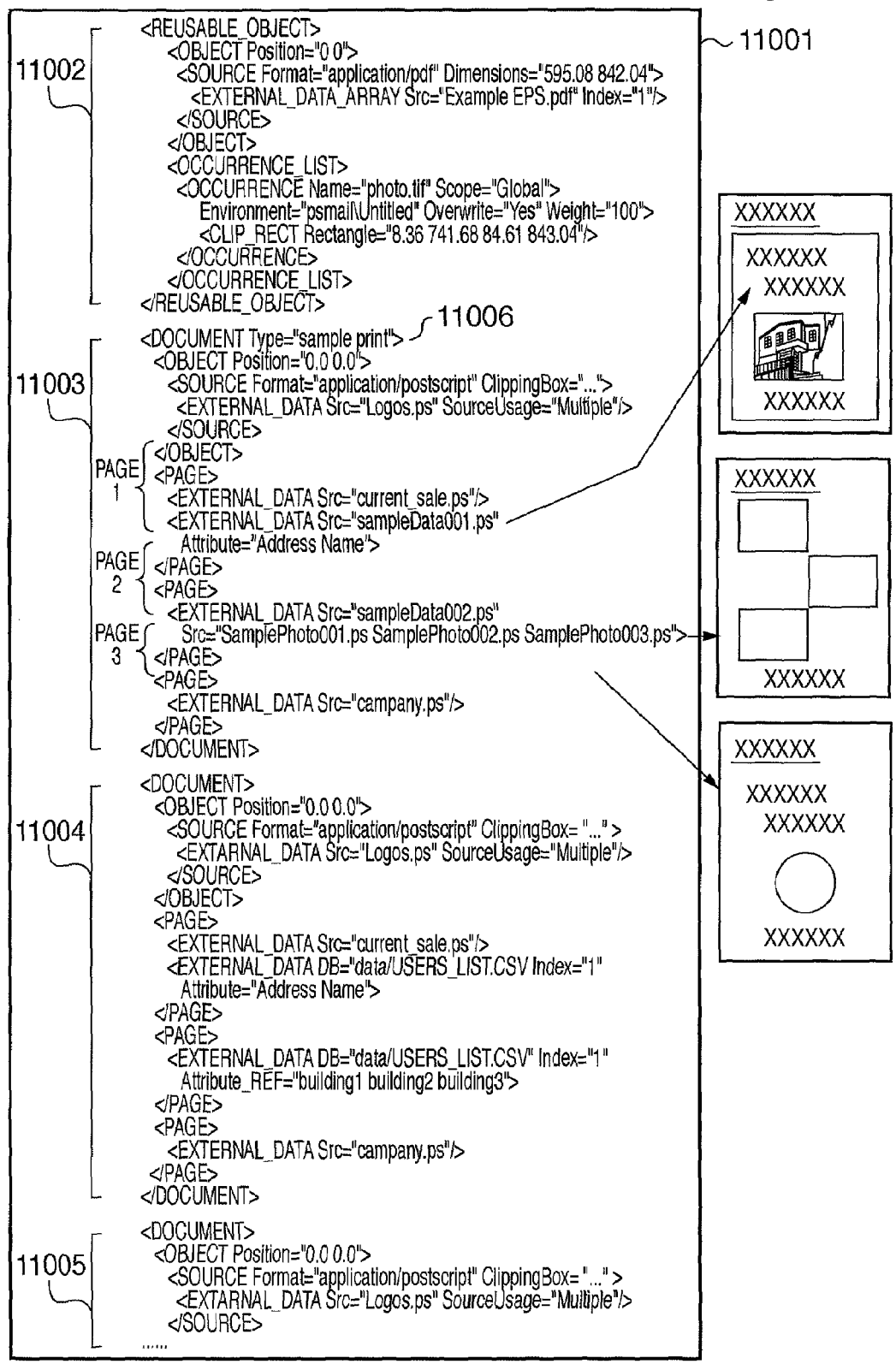
FIG. 11 is a view showing an example of print data obtained by adding sample data of variable data to print data in FIG. 8 according to the first embodiment of the present invention.

FIG. 11 is a view showing an example of print data obtained by adding sample data of variable data to print data in FIG. 8 according to the first embodiment of the present invention.

Print data 11001 is obtained by adding sample data of variable data to the print data 8001. A pre-processing instruction part 11002 designates pre-processing of a job. Sample data (specific image data) 11003 is printed as an alternative of variable data included in each record of print data. The sample data 11003 is defined by the same format as that of data included in each record, and is formed from data having text contents and image contents different from those of variable data included in each record.

A part 11004 defines the print attributes and image data of the first record of a job. A part 11005 defines the print attributes and image data of the second record of the job. A sample data identifier 11006 is used to identify sample data. When analyzing the print data 11001, the job ticket analysis unit 2010 can determine a record having the sample data identifier 11006 as a sample data record.

An example of a method of controlling the image forming apparatus 1002 and stacker 1005 when discharging a printed material to the sample tray 1007 to check the printed state while discharging printed materials to the stacking portion 1006 of the stacker 1005 will be explained with reference to FIG. 12.

Figure 12:
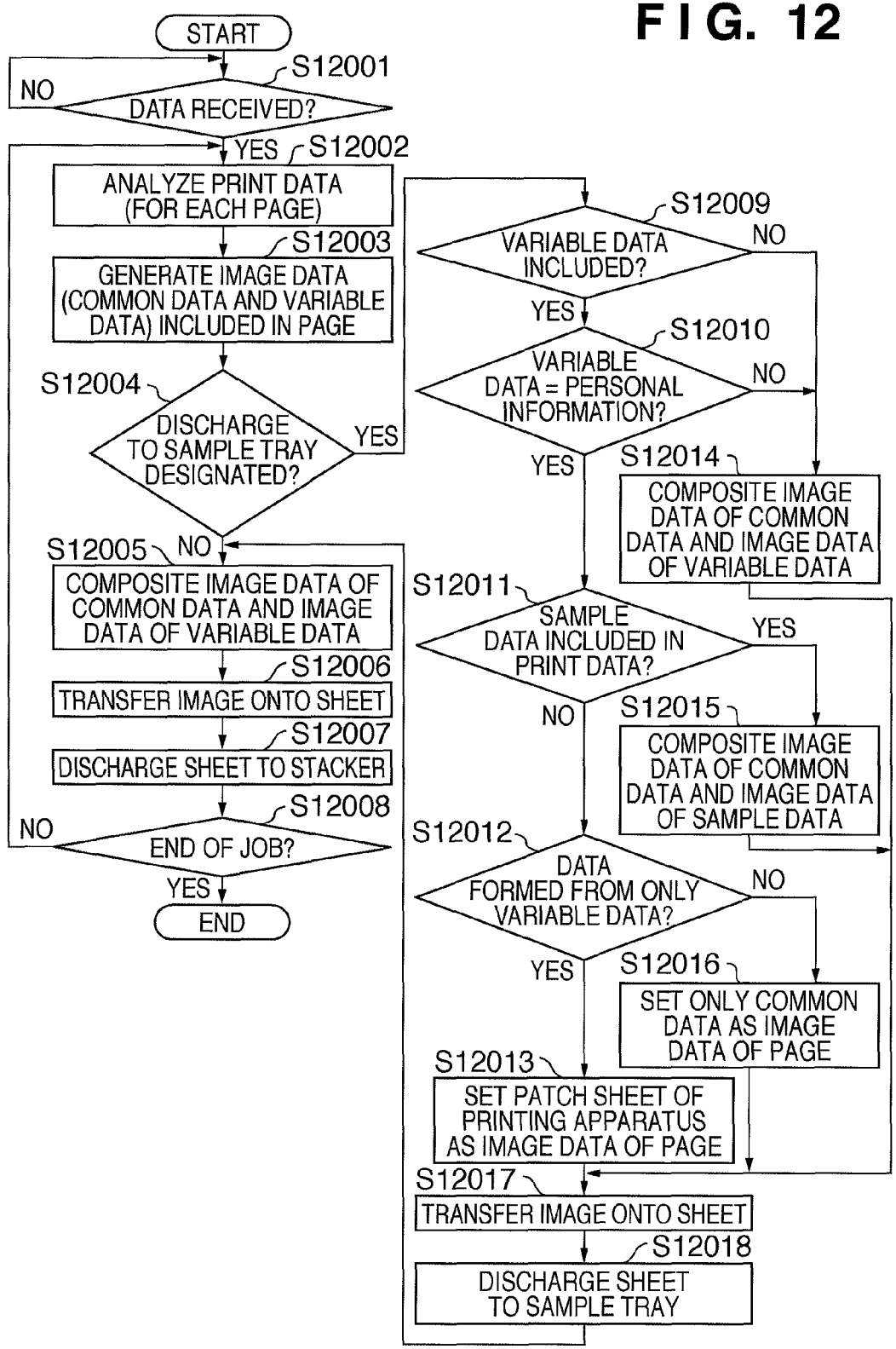
FIG. 12 is a flowchart showing the operation of the image forming apparatus according to the first embodiment of the present invention.

FIG. 12 is a flowchart showing the operation of the image forming apparatus according to the first embodiment of the present invention. Each step of this sequence is executed by controlling each module shown in FIG. 3 by the CPU 4005 of the image forming apparatus.

When the image forming apparatus 1002 is activated, it shifts to data reception standby step S12001.

In step S12001, the network control unit 2006 determines whether the image forming apparatus 1002 has received print data from an external device. If the network control unit 2006 determines that the image forming apparatus 1002 has not received print data (NO in step S12001), the process waits until the image forming apparatus 1002 receives print data. If the network control unit 2006 determines that the image forming apparatus 1002 has received print data (YES in step S12001), the process shifts to step S12002.

An example of the print data is one including the first image data common between pages or records, and the second image data different between pages or records.

In step S12002, the job ticket analysis unit 2010 analyzes the print data received from the external device, and upon completion of analyzing print data of one page, the process shifts to step S12003. In step S12002, whether a page to be printed includes variable data can be determined by analyzing the print data 8001 or 11001 by the job ticket analysis unit 2010. For example, in FIG. 9, print data includes the instruction "DATA DB='data/USERS_LIST.CSV'" for referring to the database, so it is determined that the page includes variable data. In step S12002, whether the variable data is generated from a character string can be determined by analyzing, by the job ticket analysis unit 2010, the database file 9001 which defines the contents of variable data included in print data.

In step S12003, the PDL interpreter/RIP processing unit 2011 generates image data to be printed on the page analyzed in step S12002. In step S12003, the PDL interpreter/RIP processing unit 2011 individually generates common data defined as image data common between records or pages, and image data of variable data defined by the database file 9001. When the data management unit 2009 manages in advance image data generated in step S12003, like a form image, image data managed by the data management unit 2009 can be applied.

In step S12004, the CPU 4005 determines whether the operator designates, via the operation unit 1004 or the operation window 7000 of the job generating unit 2003, discharge of the page analyzed in step S12002 to the sample tray 1007.

If the CPU 4005 determines in step S12004 that the operator does not designate discharge of the page analyzed in step S12002 to the sample tray 1007 (NO in step S12004), the process shifts to step S12005.

In step S12005, the image processing unit 4017 composites image data of common data and that of variable data which have been generated in step S12003, generating bitmap image data. When print data does not include variable data, bitmap image data of only common data is generated without executing composition processing by the image processing unit 4017.

In step S12006, the printer 4023 transfers the image data generated in step S12005 onto a sheet.

In step S12007, the stacker 1005 discharges the sheet printed in step S12006 to the stacking portion 1006.

In step S12008, the CPU 4005 determines whether all pages included in the print data have been processed. If the CPU 4005 determines that all pages included in the print data have not been processed (NO in step S12008), the process shifts to step S12002 to continue print data analysis processing.

If the CPU 4005 determines in step S12004 that the operator designates discharge of the page analyzed in step S12002 to the sample tray 1007 (YES in step S12004), the process shifts to step S12009.

In step S12009, the job ticket analysis unit 2010 determines whether the image data generated in step S12003 includes variable data. The method of determining whether image data includes variable data has been described in step S12002, and a description thereof will not be repeated.

If the job ticket analysis unit 2010 determines in step S12009 that the image data generated in step S12003 does not include variable data (NO in step S12009), the process shifts to step S12014.

If the job ticket analysis unit 2010 determines in step S12009 that the image data generated in step S12003 includes variable data (YES in step S12009), the process shifts to step S12010.

In step S12010, the job ticket analysis unit 2010 determines whether the variable data generated in step S12003 includes personal information.

If the job ticket analysis unit 2010 determines in step S12010 that the variable data generated in step S12003 does not include personal information (NO in step S12010), the process shifts to step S12014.

In step S12014, the image processing unit 4017 composites image data of common data and that of variable data which have been generated in step S12003, generating bitmap image data.

If the job ticket analysis unit 2010 determines in step S12010 that the variable data generated in step S12003 includes personal information (YES in step S12010), the process shifts to step S12011.

In step S12011, the job ticket analysis unit 2010 determines whether the print data received in step S12001 includes the sample data 11003. Whether print data includes sample data can be determined by determining whether the print data has the sample data identifier 11006.

If the job ticket analysis unit 2010 determines in step S12011 that the print data received in step S12001 includes the sample data 11003 (YES in step S12011), the process shifts to step S12015.

In step S12015, the image processing unit 4017 composites image data of common data and that of sample data, generating bitmap image data.

If the job ticket analysis unit 2010 determines in step S12011 that the print data received in step S12001 does not include the sample data 11003 (NO in step S12011), the process shifts to step S12012.

In step S12012, the job ticket analysis unit 2010 determines whether the image data generated in step S12003 is formed from only variable data.

If the job ticket analysis unit 2010 determines in step S12012 that the image data generated in step S12003 is formed from only variable data (YES in step S12012), the process shifts to step S12013.

In step S12013, the CPU 4005 sets, as image data of a page to be printed, specific image data (patch sheet image) which is managed in advance in the data management unit 2009 to measure an output density.

If the job ticket analysis unit 2010 determines in step S12012 that the image data generated in step S12003 is not formed from only variable data (NO in step S12012), the process shifts to step S12016.

In step S12016, the CPU 4005 sets, as image data of a page to be printed, only image data of common data (i.e., image data other than image data (second image data) of variable data).

In step S12017, the printer 4023 transfers, onto a sheet, an image generated in one of steps S12013 to S12016.

In step S12018, the stacker 1005 discharges the sheet printed in step S12017 to the sample tray 1007.

Figure 13:
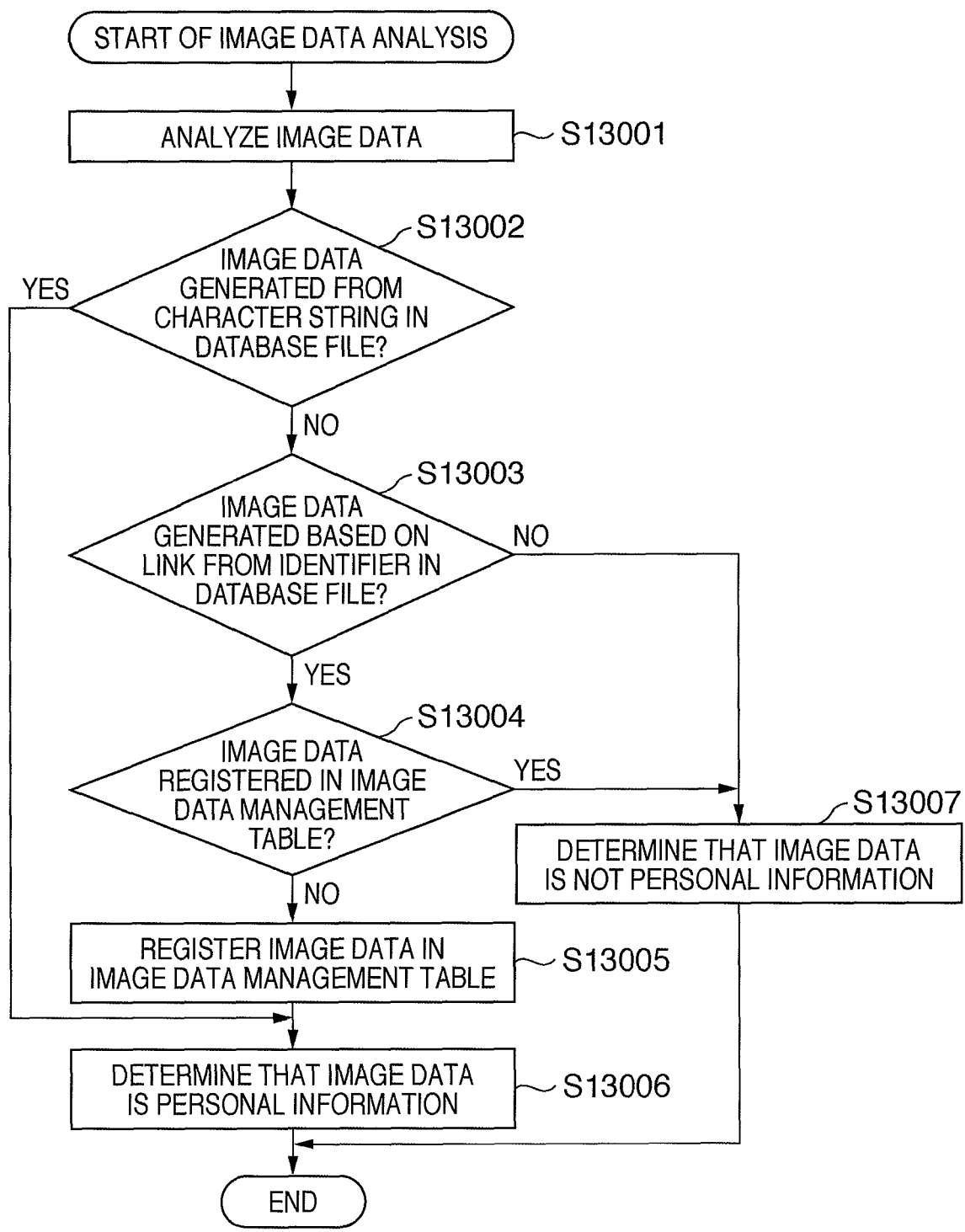
FIG. 13 is a flowchart showing details of step S12010 according to the first embodiment of the present invention.

An example of a method of controlling the type of variable data in step S12010 in the flowchart of FIG. 12 will be explained with reference to the flowchart of FIG. 13.

When the job ticket analysis unit 2010 starts variable data type analysis processing, the CPU 4005 shifts to the process of step S13001.

In step S13001, the job ticket analysis unit 2010 analyzes image data of variable data defined in print data (e.g., the print data 8001 or 11001).

In step S13002, the job ticket analysis unit 2010 determines whether the image data has been generated based on a character string included in the database file 9001 (first determination).

If the job ticket analysis unit 2010 determines in step S13002 that the image data has been generated based on a character string included in the database file 9001 (YES in step S13002), the process shifts to step S13006. In step S13006, the job ticket analysis unit 2010 determines that the analyzed image data is personal information, and ends the image data analysis processing.

For example, when the job ticket analysis unit 2010 detects a character string "XXX TARO" upon analyzing image data, the character string is included in the database of FIG. 9. Hence, the job ticket analysis unit 2010 determines YES in step S13002.

If the job ticket analysis unit 2010 determines in step S13002 that the image data has not been generated based on a character string included in the database file 9001 (NO in step S13002), the process shifts to step S13003.

In step S13003, the job ticket analysis unit 2010 determines whether the image data has been generated based on link data (e.g., the instruction 8007 in FIG. 8) serving as the identifier of image data included in the database file 9001.

If the job ticket analysis unit 2010 determines in step S13003 that the image data has been generated based on link data of image data included in the database file 9001 (YES in step S13003), the process shifts to step S13004.

If the job ticket analysis unit 2010 determines in step S13003 that the image data has not been generated based on link data of image data included in the database file 9001 (NO in step S13003), the process shifts to step S13007. In step S13007, the job ticket analysis unit 2010 determines that the analyzed image data is not personal information, and ends the image data analysis processing.

In step S13004, the job ticket analysis unit 2010 searches the image data management table 10001 in FIG. 10 to determine whether the image data is registered in the image data management table 10001 (second determination).

If the job ticket analysis unit 2010 determines in step S13004 that the image data is registered in the image data management table 10001 (YES in step S13004), the process shifts to step S13007. In step S13007, the job ticket analysis unit 2010 determines that the analyzed image data is not personal information, and ends the image data analysis processing.

If the job ticket analysis unit 2010 determines in step S13004 that the image data is not registered in the image data management table 10001 (NO in step S13004), the process shifts to step S13005.

In step S13005, the job ticket analysis unit 2010 registers the image data in the image data management table 10001, and the process shifts to step S13006. In step S13006, the job ticket analysis unit 2010 determines that the analyzed image data is personal information, and ends the image data analysis processing.

As described above, according to the first embodiment, when discharging a printed material to a specific discharge device during printing in order to check the printed state, it is controlled to print neither confidential information nor personal information.

The first embodiment can reduce the chance to view a printed material by a person permitted to perform a print operation when the printed material is discharged to a specific discharge device, and reduce the chance to leak confidential information and personal information from a printing system.

Second Embodiment

The second embodiment will describe an arrangement for reducing the chance to leak confidential information and personal information from a printing system.

Figure 14:
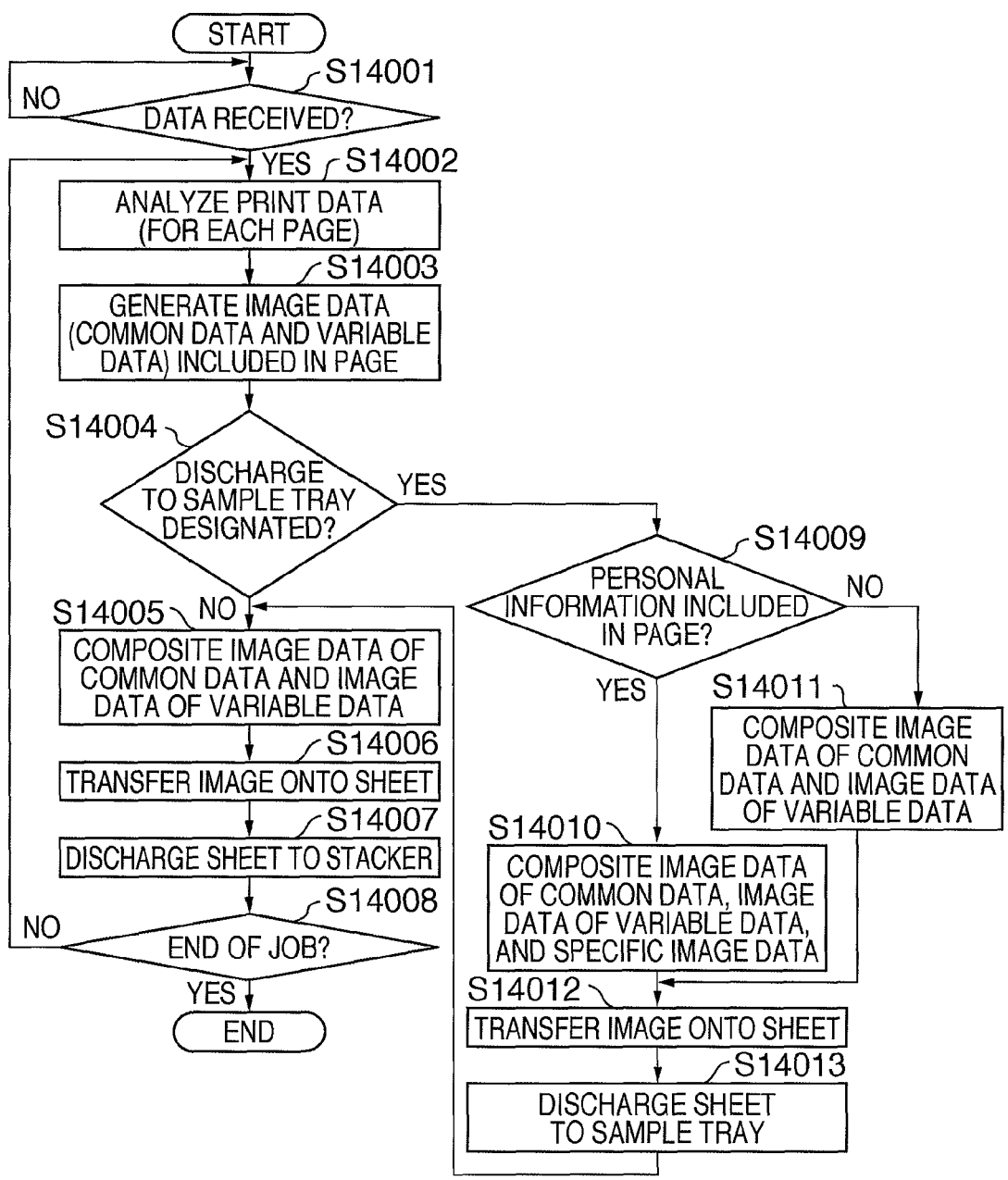
FIG. 14 is a flowchart showing the operation of an image forming apparatus according to the second embodiment of the present invention.

FIG. 14 is a flowchart showing the operation of an image forming apparatus according to the second embodiment of the present invention.

In FIG. 14, steps S14001 to S14008 correspond to steps S12001 to S12008 of FIG. 12 in the first embodiment, and a detailed description thereof will not be repeated.

If a CPU 4005 determines in step S14004 that the operator designates discharge of a page analyzed in step S14002 to a sample tray 1007 (YES in step S14004), the process shifts to step S14009.

In step S14009, a job ticket analysis unit 2010 determines whether variable data of image data generated in step S14003 includes personal information.

If the job ticket analysis unit 2010 determines in step S14009 that the variable data generated in step S14003 does not include personal information (NO in step S14009), the process shifts to step S14011.

If the job ticket analysis unit 2010 determines in step S14009 that the variable data generated in step S14003 includes personal information (YES in step S14009), the process shifts to step S14010.

In step S14010, an image processing unit 4017 composites image data of common data, that of variable data, and specific image data stored in a data management unit 2009, generating bitmap image data. The specific image data is watermark image data or copy-forgery-inhibited pattern image data.

In step S14011, the image processing unit 4017 composites image data of common data and that of variable data, generating bitmap image data.

In step S14012, a printer 4023 transfers the image data generated in step S14010 or S14011 onto a sheet. Then, the process shifts to step S14013.

In step S14013, a stacker 1005 discharges the sheet printed in step S14012 to the sample tray 1007. Then, the process shifts to step S14005.

As described above, in addition to the effects described in the first embodiment, the second embodiment can reduce the possibility of taking out, from a printing system, a printing medium bearing confidential information or personal information.

The embodiments have been described in detail. The present invention can take embodiments of a system, apparatus, method, program, storage medium, and the like.

The present invention can reduce the chance to view a printed material by a person permitted to perform a print operation when the printed material is discharged to a specific discharge device, and reduce the chance to leak confidential information and personal information from a printing system.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or script data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-024257 filed on Feb. 4, 2008, which is hereby incorporated by reference herein in its entirety.

What is claimed is:

1. An image forming apparatus which discharges, to a designated discharge tray among a plurality of discharge trays, a printing medium printed based on print data, the apparatus comprising:
   a receiver unit constructed to receive print data;
   an analysis unit constructed to analyze whether the print data includes first image data common between pages and second image data which is personal information;
   a tray determination unit constructed to determine whether or not a specific discharge tray not having a cover which prevents seeing the printing medium from the outside is designated in order to check a printing state of the print data;
   a reading unit constructed to, when the tray determination unit determines that the specific discharge tray is designated and said analysis unit analyzes that the print data includes the second image data, read specific image data serving as an alternative to the second image data; and
   a control unit constructed to, when the tray determination unit determines that the specific discharge tray is designated and said analysis unit analyzes that the print data includes the second image data, perform print processing to print the first image data and the specific image data read by the reading unit, and when the tray determination unit determines that the specific discharge tray is not designated and said analysis unit analyzes that the print data includes the second image data, perform print processing to print the first image data and the second image data.

2. The apparatus according to claim 1, wherein said control unit controls to discharge, to the specific discharge tray, a printing medium bearing an image based on image data included in the print data other than the second image data.

3. The apparatus according to claim 1, wherein
   said analysis unit comprises a first determination unit constructed to determine whether the second image data is image data formed from text data, and
   when said first determination unit determines that the second image data is image data formed from text data, said control unit controls to discharge, to the specific discharge tray, a printing medium bearing an image based on image data included in the print data other than the second image data.

4. The apparatus according to claim 1, further comprising a storage unit constructed to store a management table which manages a log of image data used to print an image based on the second image data,
   wherein said analysis unit comprises a second determination unit constructed to determine whether the second image data is image data already registered in the management table, and
   when said second determination unit determines that the second image data is image data already registered in the management table, said control unit controls to discharge, to the specific discharge tray, a printing medium bearing an image based on image data included in the print data other than the second image data.

5. The apparatus according to claim 1, further comprising an image data storage unit constructed to store specific image data,
   wherein said control unit controls to discharge, to the specific discharge tray, a printing medium bearing an image based on the specific image data stored in said image data storage unit, instead of the print data including the second image data.

6. A method of controlling an image forming apparatus which discharges, to a designated discharge tray among a plurality of discharge trays, a printing medium printed based on print data, the method comprising:
   a reception step of receiving print data;
   an analysis step of analyzing whether the print data includes first image data common between pages and second image data which is personal information;
   a tray determination step of determining whether or not a specific discharge tray not having a cover which prevents seeing the printing medium from the outside is designated in order to check a printing state of the print data;

a reading step of, when the tray determination step determines that the specific discharge tray is designated and the print data is analyzed in the analysis step to include the second image data, reading specific image data serving as an alternative to the second image data on a printing medium; and a control step of, when the tray determination step determines that the specific discharge tray is designated and the analysis step analyzes that the print data includes the second image data, performing print processing to print the first image data and the specific image data read in the reading step, and when the tray determination step determines that the specific discharge tray is not designated and the print data is analyzed in the analysis step to include the second image data, performing print processing to print the first image data and the second image data.

7. A non-transitory computer-readable storage medium on which is recorded a computer-executable program that, when executed by the computer, causes the computer to control an image forming apparatus which discharges, to a designated discharge tray among a plurality of discharge trays, a printing medium printed based on print data, the program causing the computer to execute:

a reception step of receiving print data;

an analysis step of analyzing whether the print data includes first image data common between pages and second image data which is personal information;

a tray determination step of determining whether or not a specific discharge tray not having a cover which prevents seeing the printing medium from the outside is designated in order to check a printing state of the print data;

a reading step of, when the tray determination step determines that the specific discharge tray is designated and the print data is analyzed in the analysis step to include the second image data, reading specific image data serving as an alternative to the second image data on a printing medium; and a control step of, when the tray determination step determines that the specific discharge tray is designated and the analysis step analyzes that the print data includes the second image data, performing print processing to print the first image data and the specific image data read in the reading step, and when the tray determination step determines that the specific discharge tray is not designated and the print data is analyzed in the analysis step to include the second image data, performing print processing to print the first image data and the second image data.

\* \* \* \* \*